(12) United States Patent
Massie

(10) Patent No.: US 8,142,658 B2
(45) Date of Patent: Mar. 27, 2012

(54) PROCESS FOR PREPARATION OF SUBSTRATE FOR MICROBIAL DIGESTION

(75) Inventor: Cecil T. Massie, Bloomington, MN (US)

(73) Assignee: 6Solutions, LLC, Bloomington, MN (US)

( * ) Notice: Subject to any disclaimer, the term of this patent is extended or adjusted under 35 U.S.C. 154(b) by 358 days.

(21) Appl. No.: 12/473,184

(22) Filed: May 27, 2009

(65) Prior Publication Data

US 2009/0294353 A1 Dec. 3, 2009

Related U.S. Application Data

(60) Provisional application No. 61/056,139, filed on May 27, 2008.

(51) Int. Cl.
*C02F 3/28* (2006.01)
*C12N 11/00* (2006.01)

(52) U.S. Cl. ........ 210/603; 210/615; 210/631; 435/176; 435/177

(58) Field of Classification Search ............ 210/603, 210/615, 616, 617, 631; 435/176, 177, 178, 435/179, 180, 181, 182
See application file for complete search history.

(56) References Cited

U.S. PATENT DOCUMENTS

| | | | | |
|---|---|---|---|---|
| 4,014,766 | A * | 3/1977 | Watanabe et al. | 205/746 |
| 5,582,733 | A * | 12/1996 | Desbos et al. | 210/605 |
| 6,699,707 | B1 * | 3/2004 | Hince | 435/262 |
| 2007/0059815 | A1 * | 3/2007 | Coates | 435/262 |
| 2007/0062881 | A1 * | 3/2007 | Hu | 210/748 |

* cited by examiner

*Primary Examiner* — Fred Prince
(74) *Attorney, Agent, or Firm* — Sunstein Kann Murphy & Timbers LLP

(57) ABSTRACT

Processes for microbial digestion of organic material, and preparation of substrates for microbial digestion, suitable for the production of biomethane, from municipal and industrial waste water or from municipal or agricultural waste. In addition, a method for identifying a composition of matter that is suitable for microbial digestion, more particularly anaerobic digestion and/or mixed aerobic and anaerobic digestion. Also, a system and process for detoxifying organic wastes, such as those which may be present in waste water from industrial processes.

17 Claims, 4 Drawing Sheets

PROCESS FOR PREPARATION OF SUBSTRATE FOR MICROBIAL DIGESTION

CROSS REFERENCE TO RELATED APPLICATIONS

The present application claims priority from U.S. Provisional Patent Application Ser. No. 61/056,139 filed May 27, 2008, the entire contents of which is incorporated by reference herein.

TECHNICAL FIELD

The present invention relates to microbial digestion of organic material, and more particularly to preparation of substrates from municipal and agricultural waste and municipal and industrial waste water for microbial digestion that are suitable for the production of biomethane, a substitute for natural gas.

Background Art

Low concentration solutions and suspensions of organic matter are a particularly difficult treatment problem. They contain organic matter that is readily converted to biogas, a mixture of methane and carbon dioxide, by microbial digestion, including anaerobic digestion. The concentration of the organic matter in, for example, waste water is so low, however, that the energy produced is often not even adequate to heat the water to digestion temperature. As a result, water treatment is relegated to use of energy intensive aeration basins and the potential energy source is wasted.

Traditional concepts of waste water treatment see waste water from municipal and industrial sites as liquid to be purified, such that the treatment process discards the waste sludge, recovering primarily only the purified water, and valuable metals, if present and recoverable. Typical waste water treatment processes are primarily concerned with the quality of the effluent; dissolved solids and other organics are viewed as contaminants to be eliminated and discarded as waste.

Moreover, when electrocoagulation is used in conjunction with waste water treatment processes, control problems in typical water treatment processes become severe when confronted with an aqueous stream of varying composition. As described in U.S. Pat. No. 7,280,800 issued Aug. 21, 2007, "[h]eretofore, previous "flow-through" and "static" water treatment processes have had flaws that prevented them from being viable treatments for large, complex and variable waste streams. A particular flaw was the scaling and plugging of electrodes, which plagued the treatment process as the waste water stream changed in composition. It is possible to develop a treatment scheme that will not plug the electrodes if the composition of the stream remained relatively consistent, but not if the composition varies. Efforts to install elaborate monitoring and control systems have failed when waste stream contaminants coated or blinded sensors, thus rendering the system controls useless. Other methods have been employed to prevent scaling and plugging of the electrodes including polarity reversing and other processing aids. But these methods have proven to be unreliable."

This summary of the state of the art exemplifies the long-standing assumption that the purpose of electrocoagulation is to clean up water for reuse. Other prior art that discusses the design of an electrolytic reaction chamber utilizing the principles of electrocoagulation is more art than science. For example, an April 2005 article by Peter K. Holt et al. entitled "The future for electrocoagulation as a localized water treatment technology" (see P. K. Holt et al. (2005). *Chemosphere* 59(3):355-67, incorporated by reference herein.) states that: "[e]lectrocoagulation is an enigmatic technology. Despite having been widely used for over a century, there appears to be no real consensus on the most appropriate approach for any given application, little in the way of systematic reactor design rules, and almost nothing in the way of a generic a priori modelling approach. The root cause of this situation seems to be that electrocoagulation is a technology that lies at the intersection of three more fundamental technologies—electrochemistry, coagulation and flotation."

Additional discussion of electrocoagulation, and its use for water purification, is found in letter 2318 at the Finishingdotcom website (http://www.finishing.com/2200-2399/2318.shtml) entitled Electrocoagulation (cache: as retrieved on May 1, 2008 09:47:49 GMT).

SUMMARY OF THE INVENTION

Microbial digestion, including anaerobic digestion, is a potentially significant source of renewable energy. The design of microbial digesters, particularly anaerobic digesters, centers on the concepts of hydraulic retention time and solids retention time. In a particular embodiment of the invention there is a provided a system for preparing substrate for microbial digestion that retains solids in a digester in order to facilitate complete conversion to biogas, while minimizing hydraulic retention time in order to reduce the volume of the digester and the capital investment. The distinction becomes particularly important when the carbon source is soluble in water. In such a case, the solids retention time and the hydraulic retention time are necessarily the same and the digester effluent quality is inadequate and usually uneconomic. Embodiments of the present invention provide a system and methods to separate dissolved solids from water economically, to maximize potential energy production from these dissolved solids. Particular embodiments of the current invention provide a method to render soluble organics insoluble, thereby making retention of the dissolved solids more practicable.

Surprisingly, prior to the herein described embodiments of the present invention, the question of how dissolved solids present within waste water are to be used does not appear to have been considered. But, as described herein, embodiments of the present invention and depart dramatically from what has gone before by providing systems and processes for the preparation of a substrate for microbial digestion from waste water, to be used as an energy source, rather than simply providing systems and processes for treating waste water to produce clean purified water.

Other particular embodiments of the current invention provide a system and methods for economic recovery of organics from city waste water treatment plants for consolidation into a central processing facility.

Particular embodiments of this invention provide a process for the preparation of a substrate for microbial digestion, including anaerobic digestion, and provide a method for identifying a composition of matter that is suitable for microbial digestion, particularly anaerobic digestion and/or mixed aerobic and anaerobic digestion.

Related embodiments provide a system and process for detoxifying organic wastes, such as those which may be present in waste water from industrial processes, for example. Particular embodiments provide a process for using microbes, particularly a cocktail of microbes, designed and selected to detoxify the particular organic toxin or toxins present in the waste water. In particular embodiments, detoxification is performed prior to recovery of dissolved organic solids and preparation of the substrate for microbial digestion. In related embodiments, the microbes used for detoxification may include anaerobes, aerobes, mixed aerobe/anaerobes, single-celled and multicellular organisms, fungi, or any combination thereof.

Embodiments of the invention provide a substrate for microbial digestion which facilitate the conversion of organic compounds commonly found in effluents from city and industrial operations into biomethane. Aspects of the invention view treatment of waste water in a different light from traditional concepts of waste water treatment. Rather than seeing waste water from municipal and industrial sites as liquid to be purified, discarding all but the purified water, embodiments of the present invention view waste waters as carbon bearing aqueous streams with a potential source of energy that can be consolidated and recovered for use as a substrate for microbial digestion for production of energy, particularly biomethane. Aspects of the present invention are essentially indifferent to the quality of the water leaving the recovery unit, focusing instead on recovery of dissolved and suspended solids for use as substrate for microbial digestion for energy production. In contrast, typical processes designed to treat water are primarily concerned with the quality of the effluent; dissolved solids and other organics are viewed as contaminants to be eliminated and discarded as waste.

In embodiments of the present invention, following recovery of the dissolved and suspended solids from the municipal or agricultural waste or the municipal or industrial waste water, the remaining aqueous stream, comprising dramatically reduced levels of carbon compounds and contaminants, will be treated by conventional means and/or recycled back to the recovery process.

In one particular embodiment of the invention there is provided a method for producing substrate for microbial digestion from organic material, the method comprising blending a capture solution comprising water, Fe(II) ions, micronutrients, a first population of microbes and pH buffer compounds with the organic material to produce a blended stream, electrolyzing the blended stream with an electric field in a chamber having an anode comprising iron, forming a precipitated stream of solid and liquid components, the solid components comprising an $Fe(OH)_3$ precipitate in which organic material, micronutrients, and the first population of microbes are enmeshed, optionally adding a flocculent the precipitated stream to enhance precipitation, and separating the solid and liquid components in the precipitated stream to obtain a solid organic substrate for microbial digestion and an aqueous liquid.

In related embodiments, the iron anode further comprises another metal selected from the group consisting of carbon, aluminum, magnesium, manganese, copper, cobalt, zinc, titanium, and boron. Other related embodiments provide a method for producing substrate for microbial digestion wherein a portion of the aqueous liquid is recycled and added to either the capture solution or the organic material.

Particular embodiments provide such a method wherein a volumetric ratio of the organic material stream to the capture stream ranges from 0.001 to 1 to 1000.0 to 1.

Other particular embodiments provide a method for producing substrate for microbial digestion as described, further comprising diverting the solid organic substrate to a digester. In a related embodiment, the digester contains a second population of microbes, and in other related embodiments, the second population of microbes may comprise anaerobic microbes.

Still another related embodiment for producing substrate for microbial digestion as described, wherein the solid organic substrate is diverted to a digester, provides a method further comprising maintaining conditions so as to produce biogas in the digester from the solid organic substrate. Another related embodiment provides a method as described, wherein the solid organic substrate is diverted to a digester, further comprising recovering an undigested organic material effluent from the digester and redirecting the undigested organic material for treatment of some or all of the organic material for blending with the capture solution.

Another particular embodiment provides a method of facilitating digestion of untreated organic material, the method comprising blending a solid organic substrate with the untreated organic material, and providing a ratio of the solid organic substrate to the untreated organic material effective for enhancing or facilitating digestion of the untreated organic stream. Particular related embodiments may further comprise using at least some of the biogas to produce electricity in a generator for electrolyzing, or using waste heat produced by the generator to heat a digester. Still other related embodiments may further comprise detoxifying the organic material prior to blending the capture solution with the organic material, and in some related embodiments, detoxifying may comprises subjecting the organic material to a third population of microbes. In particular related embodiments, the third population of microbes may be the same as the first population of microbes enmeshed with the precipitate, or may be different than the first population of microbes enmeshed with the precipitate.

In still other particular related embodiments, the third population of microbes may be the same as the second population of microbes in the digester, or may be different than the second population of microbes in the digester.

Another embodiment provides a substrate for microbial digestion, produced by any of the methods so described.

Another particular embodiment provides a substrate for microbial digestion comprising a $Fe(OH)_3$ lattice in which are enmeshed organic matter, anaerobes and micronutrients.

While this invention has been particularly shown and described with references to preferred embodiments thereof, it will be understood by those skilled in the art that various changes in form and details may be made therein without departing from the scope of the invention encompassed by the appended claims.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
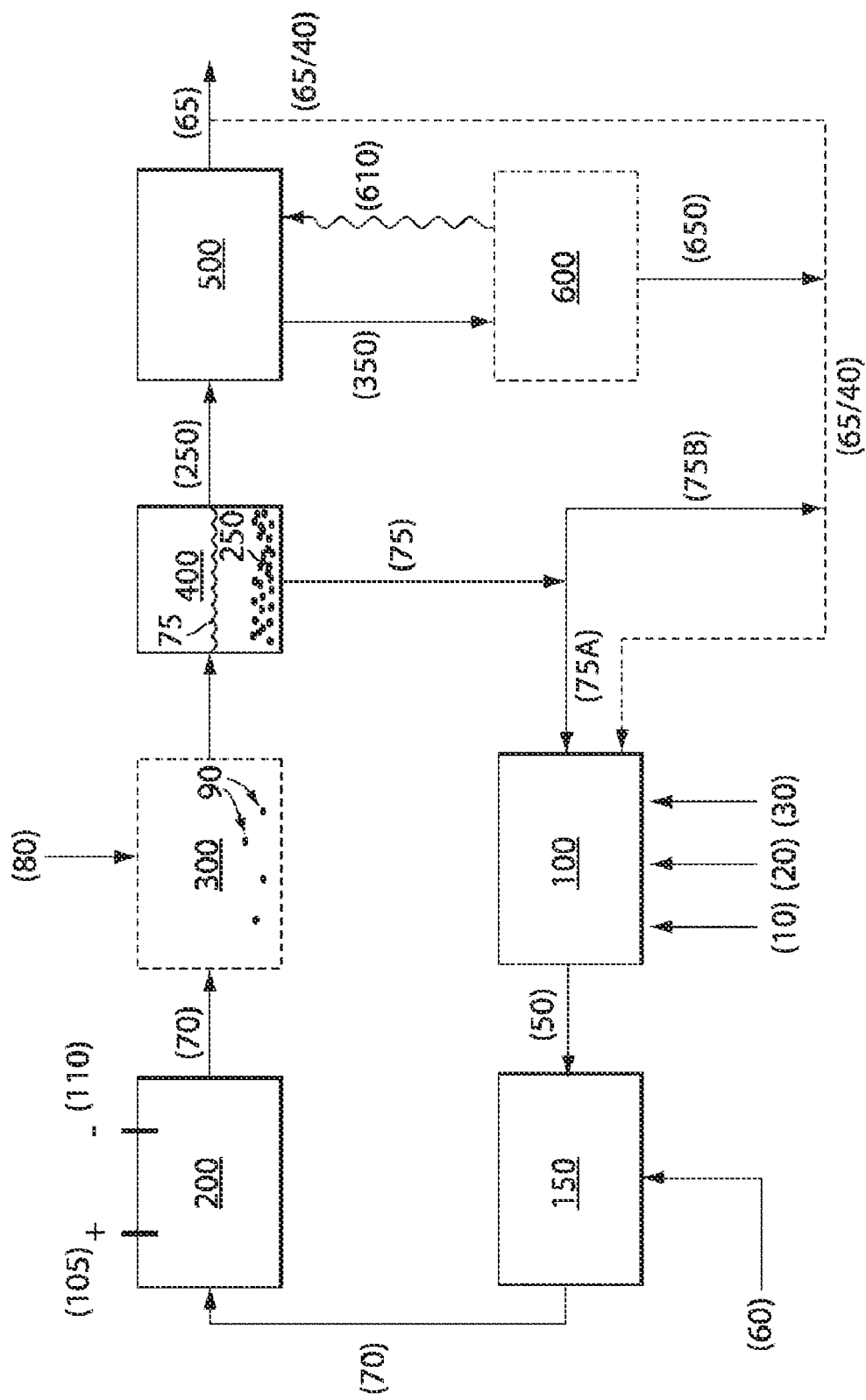
FIG. 1 is a schematic of one embodiment of the invention showing a process for preparation of a digester substrate.

Definitions. As used in this description and the accompanying claims, the following terms shall have the meanings indicated, unless the context otherwise requires:

As used herein, "recalcitrant materials" means organic materials which resist digestion by microbes.

As used herein "microbe" or "microbes" refers to bacteria, yeast, fungi and single-celled organisms which are capable of breaking down and digesting organic materials. For the purposes of this invention, the term microbe is meant to describe those microbes which facilitate anaerobic digestion of organic materials, often referred to as anaerobes, those which facilitate mixed anaerobic and aerobic digestion of organic materials, and those which facilitate aerobic digestion of organic material, often referred to as aerobes. The term includes both prokaryotic and eukaryotic species, including single-celled organisms and microscopic multicellular organisms. For example, as used herein, microbes include, but are not limited to, archaea, protists such as algae, protozoa and slime molds, single-celled and multicellular microscopic animals such as amoeba, planarian, nematodes and rotifers, single-celled and multicellular microscopic plants such as algae, and plankton including phytoplankton and bacterioplankton, and fungi.

"Organic material" means a composition such as municipal or agricultural sewage waste, that includes primarily organic components in an environment that may also include water, such as municipal or industrial waste water.

"Untreated organic material" is "organic material" as defined herein that has not been subjected to any treatment or purification process, such as filtration, electrocoagulation, chlorination, detoxification, or other treatment process.

"$Fe(OH)_3$ lattice" means a solid porous composition having any of H-bonding, electrostatic forces van der Waal's forces or dipole forces between molecules, capable of enmeshing organic components, ions and microbes, and which can be created using electrocoagulation.

Typically, the digestion process proceeds in stages in which different species of microbes, including primarily anaerobes but also possibly aerobes, single-cell organisms and fungi, sequentially convert complex organic molecules first to organic acids and then to methane and carbon dioxide. This process is especially efficient when the organisms form a micro-ecosystem with the different species located close to each other on a fixed substrate. In particular, anaerobes tend to attach to a solid substrate and feed from organic matter as it passes by. A highly desirable condition is to create a framework for microbes, particularly anaerobes, to attach to with a food supply linked in close proximity. If sufficiently porous, such a framework allows the exchange of metabolic products at a micro-environment which forms around the framework, and the flow of wastes away from the micro-environment. Experiments using fixed-bed microbe populations have shown increased reactor productivity. (See e.g. butyric acid production—U.S. Pat. No. 5,563,069 Yang/Ohio State, incorporated by reference herein). Embodiments of the current invention create a new framework for microbial digestion of organic substrates, with each cycle overcoming problems of fouling or blockage which may arise over time with other fixed-bed frameworks.

Suitable microbes, including ATCC 55339, a type of methanogen, include those which have been shown to reduce insoluble ferric iron to soluble ferrous iron ($Fe^{+2}$). See U.S. Pat. No. 5,667,673, incorporated by reference herein. In the '673 patent, however, the ferric iron is present in the form of magnetite or other iron bearing solid. The organisms described in the '673 patent attach to the iron-bearing solid, but this does nothing to improve the contact between the organic molecule and the iron/microbe structure. In contrast, current embodiments of the invention hold feedstock or organic substrate in close proximity to the microbes.

As used herein, recalcitrant materials is a term applied to organic materials which resist digestion by microbes. It is known that some of these materials can be digested if there is a suitable electron receptor available to take an electron from the surface of the microbe. Iron +3 or ferric ion either in solution or in solid state, has been shown to be a suitable electron receptor.

In a first embodiment of the invention there is provided a process for the production of substrate for microbial digestion. FIG. 1 is a schematic of one such embodiment showing an overview of a process for preparation of a digester substrate. Fe(II) ions 10, and micronutrients 20, are blended with recycled aqueous 75A in Solution Preparation Tank 100, and adjusted and maintained, along with the pH 30 as needed, to feed microbes 40 (not shown) associated with the organic matter, not shown. The capture solution 50 prepared in tank 100 is then later fed to Electrolytic Chamber 200. In certain embodiments, Fe(II) ions 10 are prepared by electrolytic conversion of an iron anode into soluble Fe(II) hydroxide, such as in Electrolytic Chamber 200.

An incoming aqueous organic carbon source 60 (such as municipal or industrial waste water) is metered to a desirable ratio, and may be a solution, suspension or slurry. Organic carbon source 60 is blended with prepared capture solution 50 in blender 150 and the blended stream 70 is fed to electrolytic chamber 200, where controlled voltage and current density is applied to the stream 70. Electrolytic chamber 200 has a positive electrode 105 and negative electrode 110, wherein the anode may comprise iron and other suitable components such as magnesium, copper, cobalt, zinc, manganese, aluminum, titanium, carbon and boron, among others In chamber 200, the anode 110 is partially consumed when Fe(III) ions form upon application of an electric current, which then subsequently form $Fe(OH)_3$ precipitate. The $Fe(OH)_3$ precipitate, which is a porous material, then captures organic material, ions and larger particles in its porous structure, as it precipitates, as well as the microbes. Larger clusters, colloidal materials and some suspended solids may also precipitate during application of the electric field in chamber 200. As stream 70 leaves chamber 200, a flocculent 80 may be added in mixer 300 to promote separation of solids 90 in stream 70.

Solids 90 which form in chamber 200, whose formation is enhanced with addition of flocculent 80 in mixer 300, are separated from the liquid stage in liquid/solid separator 400 by filtration, flotation or any other standard solid/liquid separation technique known to those in the art. A portion of the separated aqueous stream 75, equivalent to incoming aqueous carbon source 60, is discharged and the bulk (75A) recycled back to solution preparation tank 400. The portion of the aqueous stream not recycled (75B) is drawn off from stream 75 to undergo final water treatment, purification and/or discharge. Stream 75B may undergo additional treatment before recycle to remove, for example, ammonia or other compounds which may interfere with the substrate formation if allowed to accumulate in the recycled stream.

Solid carbon material 90, separated from the liquid phase in separator 400 is drawn off and becomes digester substrate 250 for microbial digestion in digester 500, as needed, while the liquid phase 75, as described, is recycled (75A) to preparation tank 100 and/or routed for treatment and purification (75B).

The above-described particular embodiment of the process includes three primary elements: a capture solution preparation tank 100, an electrolytic chamber 200, and a liquid/solid separator 400, and a secondary element, blender 150. There may also be a fifth element, mixer 300, and a sixth element, generator 600, shown in FIG. 1 with dotted lines. The capture solution preparation tank 100 is used to maintain the concentration of ferrous ($Fe^{+2}$) ions 10, the pH 30 and micronutrients 20 that will be captured with the organic matter 150 to feed the microbes 40 (not shown). In a further related embodiment of the invention, microbes 40 in the effluent 65, recycled from the digester 500, are recycled into the preparation tank 100 for later co-precipitation with digester substrate 250.

Particular embodiments of the invention utilize a variation on electrocoagulation in electrolytic chamber 200 to effect the separation of organic matter from aqueous organic carbon source 60. Those of skill in the art understand that any commercially available electrocoagulation system, such as that available from Powell, can be used at this stage in the process, in addition to custom designed systems.

In one preferred embodiment, the ferrous ions 10 are prepared by electrolytic conversion of an iron anode to soluble ferrous hydroxide. Prior to entering electrolytic chamber 200, a metered ratio of aqueous organic carbon bearing solution, suspension or slurry 60 is added to prepared capture solution 50 to generate blended stream 70.

Embodiments of the present invention encompass a manageable approach to using coagulation as a means of preparing a digester substrate by focusing on a preparation of a stream having a known, controlled composition. This stream of known, controlled composition is the "capture solution" referred to as element 50 above. Capture solution 50 is not simply recycled aqueous stream 75A, because the system may contain compounds such as ammonia, which interfere with the complexing and precipitation of heavy metals. Such compounds may have to be removed by other processes before capture solution 50 can be reconstituted. Capture solution 50 and the controlled ratio of its organic materials to aqueous stream is one of the innovations that distinguishes the present processes for preparation of a substrate for microbial digestion from those processes that simply to treat waste water to remove waste solids and impurities to generate purified, clean water.

In theory, it is possible for capture solution 50 to circulate through the system forming ferric iron hydroxide precipitates, recovering the water, and making new ferrous hydroxide solution in perpetuity. In such a cycle, any hydrogen gas generated as a co-product with the biomethane could be captured and used, for example in a fuel cell, to make electricity to drive the electrocoagulation step and overall process for preparation of a digester substrate.

More importantly, as described herein, embodiments of the invention introduce a carbon rich stream 60 into the flowing capture stream 50 at a controlled rate to produce blended stream 70. The capacity of the electrocoagulation system utilized in electrolytic chamber 200 to precipitate dissolved solids present in carbon stream 60 will be a function of the composition of the stream. As capture stream 50 is fed into electrolytic chamber 200, some or all of the carbon entering the system in stream 60 will be co-precipitated with components in capture stream 50.

The natural variability of the carbon stream which is so vexing to current waste water treatment processes is of little concern to the presently described process for preparing substrate for microbial digestion. Assuming the exact composition of carbon stream 60 varies over some range, by controlling the ratio of capture stream 50 to carbon source stream 60, any fluctuations in composition of carbon stream 60 will be lessened until they are manageable and do not present a problem to the efficacy of the overall process.

By focusing on the quality of the precipitate rather than the purity of the recovered water, it is not important whether the water is fully treated when it leaves the process as stream 75. Fluctuations in water quality of stream 75 will be dealt with by a downstream process.

Figure 2:
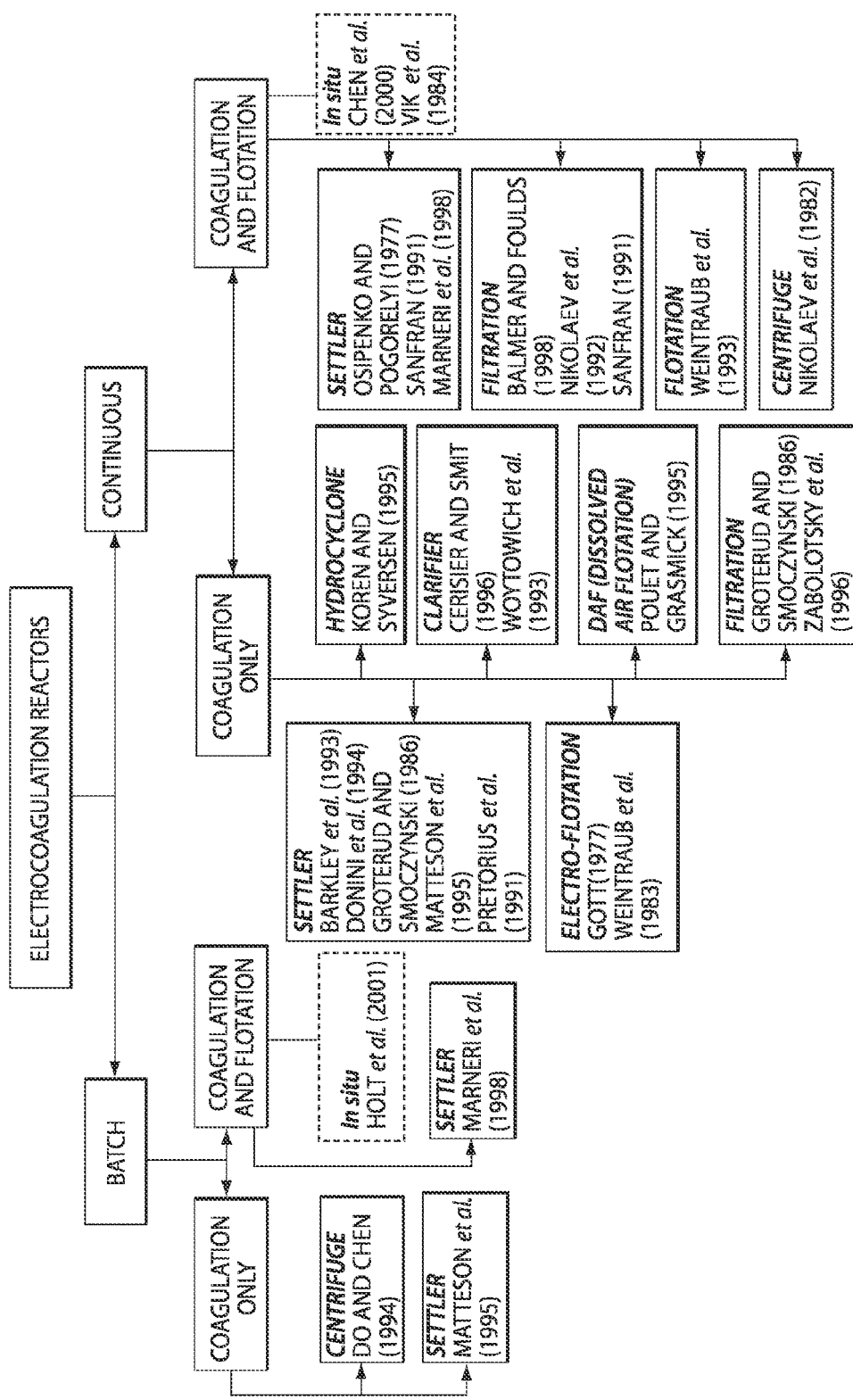
FIG. 2 shows a classification of electrocoagulation reactor systems.

In various embodiments, recovery of solids 90 from stream 70 can take a number of forms. As discussed by P. K Holt in the above Chemosphere/reference, FIG. 2 presents a number of options for such recovery.

For example, the electrocoagulation process to recover solids 90 may be carried out in a batch or continuous process, or even in a semi-continuous manner.

In particular embodiments, the ratio of carbon stream 60 to prepared capture stream 50 is carefully adjusted to maximize the desired outcome, which may include maximum solids recovery, highest substrate production rate, or cleanest water discharge. Other desirable outcomes may arise under the specific application of the claimed invention.

Figure 3:
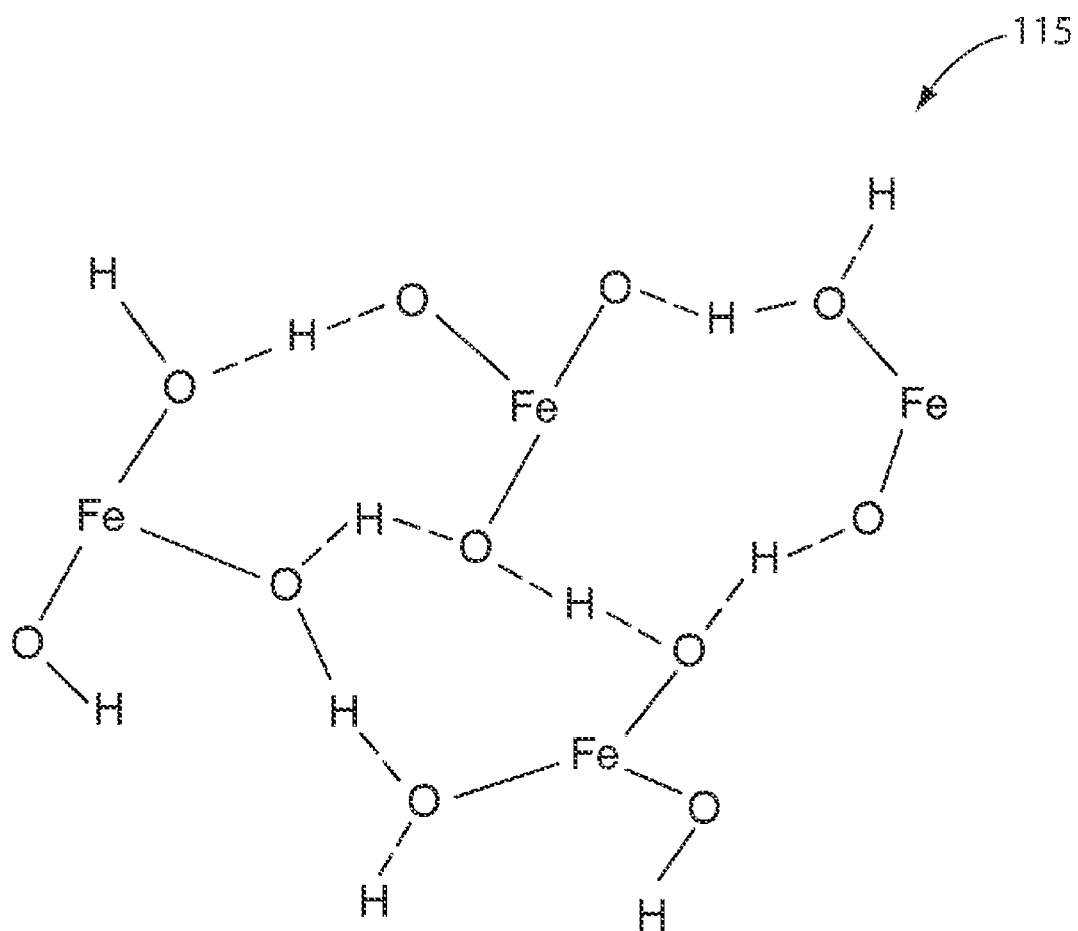
FIG. 3 is a schematic showing an example of a precipitate of ferric hydroxide which forms an open lattice of crystalline bonding, hydrogen bonding and electrostatic attraction. Due to the rapid formation of the precipitate, non-ferric ions are frequently trapped in the crystal structure while organic and other large molecules become entangled in the web. In addition due to the highly charged sites in the crystal, colloidal suspensions become attached to the crystal as it forms. In water treatment this is called sweep flocculation.

Blended stream 70 is fed to the electrolytic chamber 200 in which electricity of controlled voltage and current density is applied to the stream. The system contains sacrificial anodes 110 which most typically contain iron but which may include other elements such as magnesium aluminum, titanium, boron, to name a few. The formation of ferric ions in the presence of the electrical field triggers formation of a porous ferric hydroxide precipitate framework 115. FIG. 3 is a schematic of an example of such a precipitate framework. As can be seen in FIG. 3, the ferric hydroxide forms an open lattice of crystalline bonding, hydrogen bonding and electrostatic attraction. Due to the rapid formation of the precipitate, non-ferric ions are frequently trapped in the crystal structure while organic and other large molecules become entangled in the web. In addition due to the highly charged sites in the crystal, colloidal suspensions become attached to the crystal as it forms. In water treatment this is called sweep flocculation.

Figure 4:
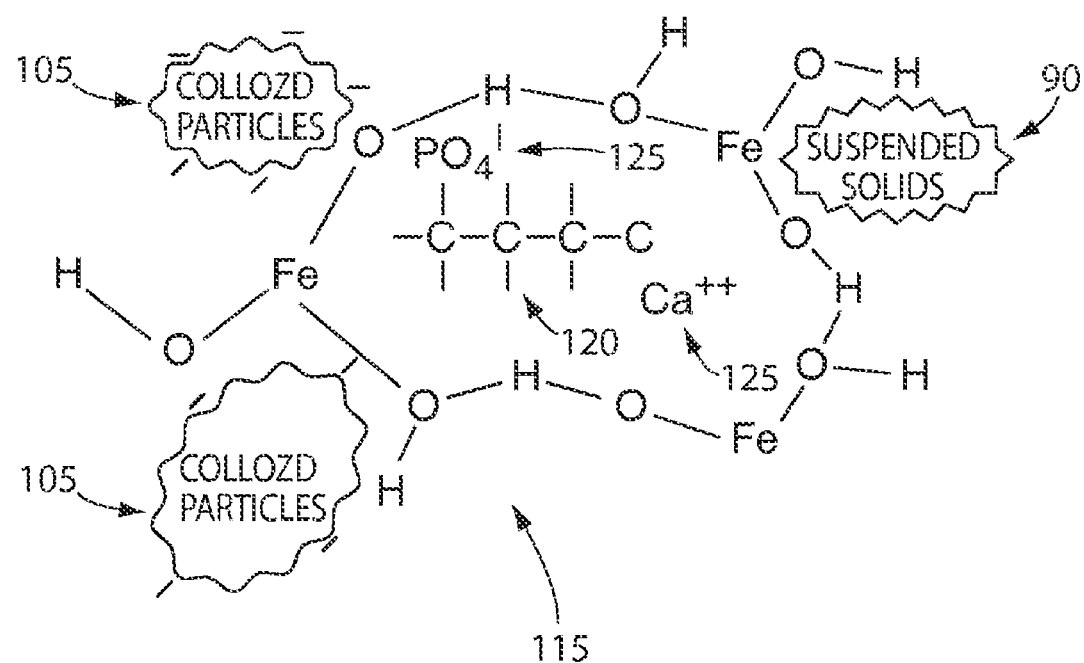
FIG. 4 is a schematic showing an example of a precipitate of ferric hydroxide precipitate showing how particles are trapped inside and around the ferric hydroxide precipitate.

This porous material can capture small organic molecules 120, some ions 125 and entangle larger molecules 130 in the framework 115. Some colloidal materials 105 and suspended solids 90 will precipitate due to changes in their surface charge related to the change in the electrical field. Either direct or alternating current may be used in the electrolytic chamber. FIG. 4 is a schematic of an example of a precipitate of ferric hydroxide precipitate showing how particles are trapped inside and around the ferric hydroxide precipitate.

Upon exiting the electrolytic chamber 200, a flocculent 80 may be added, for example in mixer 300 of FIG. 1, to stream 70 to promote separation.

The solids 90 formed in the electrolytic chamber 200 and assisted by the addition of flocculent 80 are readily separable from the liquid phase 75 either by filtration, flotation or other liquid/solid separation technique in separator 300. A water stream 7A5, equivalent to the incoming carbon source 60, is recycled to the capture solution preparation tank 100. The balance of the solution of 75B, is discharged from the process for further treatment before discharge.

In a highly preferred form of this process the substrate 250 so prepared is digested immediately in digester 500, and the biogas 350 formed by the digestion process may be used to produce the electricity 650 for the electrolytic process. Waste heat 610 from a generator 600 can be used to heat digester 500.

In a second embodiment of the invention there is provided a substrate or feedstock for anaerobic digestion, produced by the process described above. Such a substrate may comprise:

A co-precipitate of ferric hydroxide containing:
1. Ferric hydroxide
2. Organic matter
3. Anaerobes
4. Optional micronutrients Other materials may be incorporated into the mixture in order to facilitate digestion, control pH or improved handling characteristics of either the substrate itself or the resulting biosolids and residue from the digestion process. For example, magnesium ion may be added to the process to cause formation of insoluble struvite during digestion. Continuous struvite formation is a way to complex ammonia from the digester and thereby control or prevent potential ammonia toxicity.

Digester substrate embodiments of the claimed invention have particular utility because as substrate is digested, the ferric hydroxide framework is reduced to soluble ferrous hydroxide. Ferrous ions are highly beneficial in water treatment for controlling hydrogen sulfide formation and for complexing with heavy metals to remove them from treated water. Excess ferrous ions are readily removed from treated water by aeration which causes formation of insoluble ferrous oxides. These are in turn separable by sand or other types of filtration, or by flotation or other liquid/solid separation technique.

Another particular embodiment of the invention concerns the use of substrates as described above, or substrates produced in the processes described above. It is envisioned that the addition of such substrates to organic streams, such as animal wastes, will promote the digestion of the organic materials without them actually passing through a preparation process.

Therefore, related embodiments provide the process of using a substrate prepared by the above-described process, or using a substrate meeting the composition of matter as described above, in a digester for the production of biogas.

FIG. 3 is a schematic showing an example of a precipitate of ferric hydroxide which forms an open lattice of crystalline bonding, hydrogen bonding and electrostatic attraction.

FIG. 4 is a schematic showing an example of a precipitate of ferric hydroxide which forms an open lattice of crystalline bonding, hydrogen bonding and electrostatic attraction. Due to the rapid formation of the precipitate, non-ferric ions are frequently trapped in the crystal structure while organic and other large molecules become entangled in the web. In addition due to the highly charged sites in the crystal, colloidal suspensions become attached to the crystal as it forms. In water treatment this is called sweep flocculation.

The embodiments of the invention described above are intended to be merely exemplary; numerous variations and modifications will be apparent to those skilled in the art. The steps of the process may be executed in batch, semi-continuous or continuous manner. All such variations and modifications are intended to be within the scope of the present invention as defined in any appended claims.

What is claimed is:

1. A method for producing substrate for microbial digestion from organic material, the method comprising:

blending a capture solution comprising water, Fe (II) ions, micronutrients, a first population of microbes and pH buffer compounds with the organic material to produce a blended stream;

electrolyzing the blended stream with an electric field in a chamber having an anode comprising iron;

forming a precipitated stream of solid and liquid components, the solid components comprising an Fe(OH)3 precipitate in which organic material, micronutrients, and the first population of microbes are enmeshed;

optionally adding a flocculent the precipitated stream to enhance precipitation;

separating the solid and liquid components in the precipitated stream to obtain a solid organic substrate for microbial digestion and an aqueous liquid.

2. A method according to claim 1, wherein the iron anode further comprises another metal selected from the group consisting of carbon, aluminum, magnesium, manganese, copper, cobalt, zinc, titanium, and boron.

3. A method according to claim 1, wherein a portion of the aqueous liquid is recycled and added to either the capture solution or the organic material.

4. A method according to claim 1 in which a volumetric ratio of the organic material stream to the capture stream ranges from 0.001 to 1 to 1000.0 to 1.

5. A method according to claim 1, further comprising diverting the solid organic substrate to a digester.

6. A method according to claim 5, wherein the digester contains a second population of microbes, and wherein the second population of microbes comprise anaerobic microbes.

7. A method according to claim 5, further comprising maintaining conditions so as to produce biogas in the digester from the solid organic substrate.

8. A method according to claim 5, further comprising:
recovering an undigested organic material effluent from the digester;
redirecting the undigested organic material for treatment of some or all of the organic material for blending with the capture solution.

9. A method according to claim 7, further comprising using at least some of the biogas to produce electricity in a generator for electrolyzing.

10. A method according to claim 9, further comprising using waste heat produced by the generator to heat a digester.

11. A method according to claim 9, further comprising, detoxifying the organic material prior to blending the capture solution with the organic material.

12. A method according to claim 11, wherein detoxifying comprises subjecting the organic material to a third population of microbes.

13. A method according to claim 12, wherein the third population of microbes is the same as the first population of microbes enmeshed with the precipitate.

14. A method according to claim 12, wherein the third population of microbes is different than the first population of microbes enmeshed with the precipitate.

15. A method according to claim 12-14, wherein the third population of microbes is the same as the second population of microbes in the digester.

16. A method according to claim 12-14, wherein the third population of microbes is different than the second population of microbes in the digester.

17. A substrate for microbial digestion, produced by the method of any of claims 1-8 or 9-14.

* * * * *